United States Patent
Moore

(10) Patent No.: US 9,866,578 B2
(45) Date of Patent: Jan. 9, 2018

(54) SYSTEM AND METHOD FOR NETWORK INTRUSION DETECTION ANOMALY RISK SCORING

(71) Applicant: AlphaSix Corp, Sterling, VA (US)

(72) Inventor: Stephen Moore, Sterling, VA (US)

(73) Assignee: AlphaSix Corp., Sterling, VA (US)

( * ) Notice: Subject to any disclaimer, the term of this patent is extended or adjusted under 35 U.S.C. 154(b) by 0 days.

(21) Appl. No.: 14/559,186

(22) Filed: Dec. 3, 2014

(65) Prior Publication Data

US 2016/0164902 A1 Jun. 9, 2016

(51) Int. Cl.
*H04L 29/06* (2006.01)

(52) U.S. Cl.
CPC ...... *H04L 63/1433* (2013.01); *H04L 63/1416* (2013.01)

(58) Field of Classification Search
CPC ............................ H04L 63/1433; G06F 21/557
See application file for complete search history.

(56) References Cited

U.S. PATENT DOCUMENTS

| | | | | |
|---|---|---|---|---|
| 8,904,540 B1* | 12/2014 | Kalle | ............ | G06F 21/577 726/25 |
| 2003/0139905 A1* | 7/2003 | Helsper | ............ | G06F 11/3006 702/182 |
| 2006/0085543 A1* | 4/2006 | Hrastar | ............ | H04L 63/1408 709/224 |
| 2007/0136221 A1* | 6/2007 | Sweeney | ............ | G06F 17/30914 706/20 |
| 2007/0169194 A1* | 7/2007 | Church | ............ | G06F 21/552 726/23 |
| 2009/0052330 A1* | 2/2009 | Matsunaga | ............ | H04L 1/0019 370/242 |
| 2011/0107155 A1* | 5/2011 | Hirose | ............ | G06F 21/552 714/48 |
| 2011/0145657 A1* | 6/2011 | Bishop | ............ | G06F 11/3495 714/47.1 |
| 2012/0210429 A1* | 8/2012 | Stute | ............ | C12Q 1/6804 726/23 |

(Continued)

FOREIGN PATENT DOCUMENTS

WO  WO 2013/0297240 A1   3/2013
WO  WO 2013037038 A1 *  3/2013  ............ G06F 3/1407

OTHER PUBLICATIONS

Steven Choy. "Taking Your Servers Pulse" © 2008 Microsoft Corporation and CMP Media, LLC (4 pages) https://technet.microsoft.com/en-us/magazine/2008.08.pulse.aspx.*

(Continued)

*Primary Examiner* — Joseph P Hirl
*Assistant Examiner* — Thomas Gyorfi
(74) *Attorney, Agent, or Firm* — Barnes & Thornburg LLP

(57) ABSTRACT

Systems, methods, and computer-readable storage media for scoring network anomaly risk. A system identifies a baseline usage for a facet of a server and determines, for the facet, a normal range of use based on the baseline usage. The system also determines an abnormal range of use based on the baseline usage. When actual usage data is available, the system determines whether the usage data corresponds to the normal range of use or the abnormal range of use, and calculates a facet score based on the abnormality value.

28 Claims, 7 Drawing Sheets

(56) References Cited

U.S. PATENT DOCUMENTS

| | | | | |
|---|---|---|---|---|
| 2013/0297240 A1* | 11/2013 | Dutton | ................... | G01D 4/00 |
| | | | | 702/61 |
| 2013/0297242 A1* | 11/2013 | Bartmess | ............... | G06Q 50/06 |
| | | | | 702/61 |
| 2014/0229768 A1* | 8/2014 | Bernstein | .............. | G06F 11/079 |
| | | | | 714/39 |
| 2014/0259094 A1* | 9/2014 | Narayanaswamy | | H04L 63/0272 |
| | | | | 726/1 |

OTHER PUBLICATIONS

Brent Ozar. "SQL Server Perfmon (Performance Monitor) Best Practices" Published Dec. 30, 2006 (9 pages) https://www.brentozar.com/archive/2006/12/dba-101-using-perfmon-for-sql-performance-tuning/.*

Tom Carpenter. "Monitor Windows Server with Performance Counters" Published Oct. 11, 2009 (7 pages) http://windowsitpro.com/systems-management/monitor-windows-server-performance-counters.*

William R. Stanek. "Monitoring Server Performance and Activity" Excerpt from Chapter 3 of "Microsoft Windows 2000 Administrator's Pocket Consultant" © 1999 Microsoft Corp. (6 pages) https://msdn.microsoft.com/en-us/library/bb726968.aspx.*

International Search Report and Written Opinion dated Feb. 5, 2016 for PCT/US2015/063324.

* cited by examiner

SYSTEM AND METHOD FOR NETWORK INTRUSION DETECTION ANOMALY RISK SCORING

BACKGROUND

1. Technical Field

The present disclosure relates to network intrusion detection and more specifically to scoring deviations from baseline usage.

2. Introduction

Network security has become an essential aspect of life in the information age. However, correctly determining when networks are appropriately or inappropriately accessed and used can be difficult. In addition, network security can vary from a hardware perspective to server farms and up to international networks.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for scoring network anomaly risk. A system configured according to this disclosure can receive usage data from each server in a network of servers, where the usage data has various facets. Facets are networking parameters, such as a number of outgoing connections at a specific time, a number of incoming connections between certain hours, types of protocols used, etc. The usage data for each server can then be compared to baseline usages of the facets for each server. From the comparison, the system can generate an anomaly score for each server in the network, which can be used to create an anomaly report. The anomaly score can indicate a likelihood of an anomaly occurring at each server and the anomaly report can be a list of the individual anomaly scores of each server in the network.

DETAILED DESCRIPTION

Figure 1:
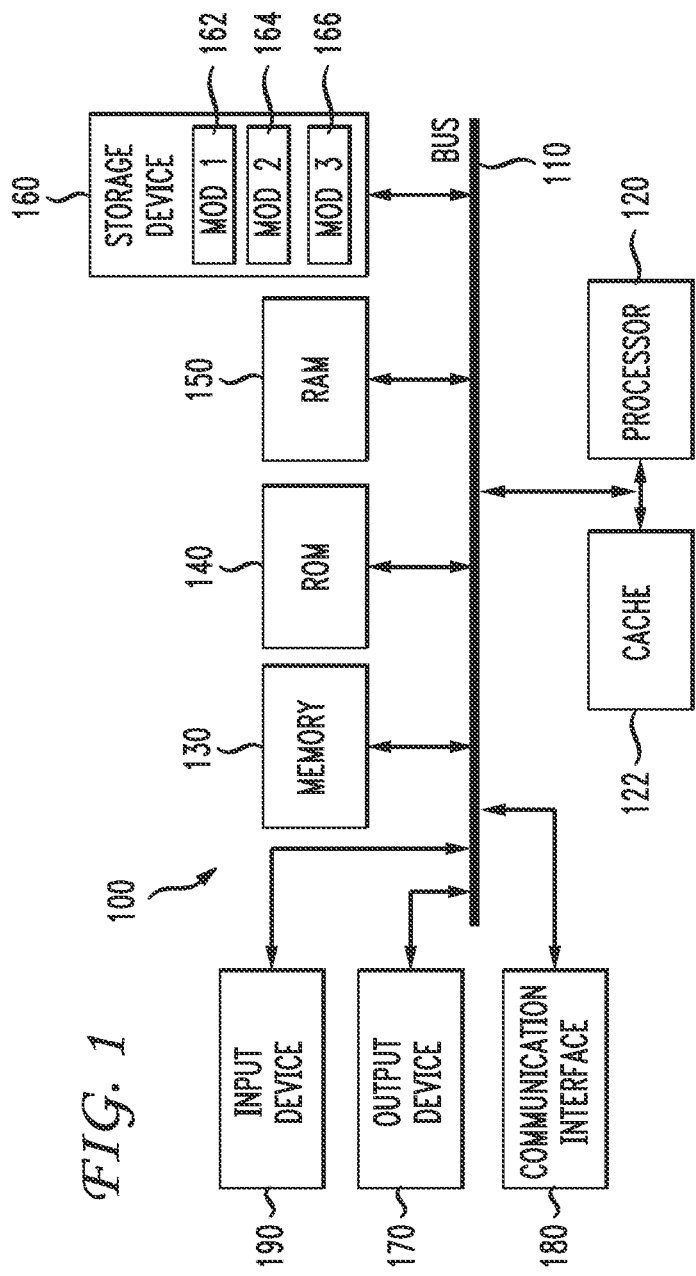
FIG. 1 illustrates an example system embodiment.

A system, method and computer-readable media are disclosed which score risk of network anomalies. The system identifies a baseline level of network use over various parameters, or facets, for each server in the network. The servers can be hosts, clients, relays, switches, computers, and/or other network components. References to servers are therefore non-limiting examples of possible network components.

The system compares the baseline level for a baseline period of time to an actual usage over a usage period of time. The baseline period of time and the usage period of time can be the same or can be distinct. As an example, both the baseline and the actual usages could be for a single day, where the system is comparing usage levels between two specific days. However, in many instances the baseline usage levels will be averages over a longer period of time than the actual usage in question. For example, the baseline level of usage could be averaged and/or summed over a month, while the actual usage could be regarding the past hour. In yet other instances, the baseline can reflect a relatively shorter amount of time (for example, one week) while the actual usage is for a longer period of time (for example, one year).

The data used for both the baseline and actual usage levels depends on the particular embodiment being used, what facets are available for collection, preferences of network administrators, past user behavior, the length of the baseline and actual usage periods of time, and network configuration. Exemplary facets can include how many outgoing connections occurred during the respective time periods, what ports are used, when the ports are used, a number of incoming connections between certain hours, types of protocols used (i.e., DHCP, SMTP, peer-to-peer), rates of connections (for example, weather gadgets generally make a high number of connections), number of administrator log-ins, bandwidth usage, upload/download rates, and/or any other data metric which could be analyzed regarding network usage or network security. Exemplary data metrics could include how many files a user accessed on a particular system, a number of changes to files in an executable path, and/or other network or non-network data metrics. In addition, the systems and methods disclosed herein can use host-based information, in addition to or in place of network-based information. Exemplary host-based information can include how many files a user has accessed, which files the user has accessed, how many USB devices are attached to one or more servers, etc.

The comparison between baseline usage and actual usage can be granular. For example, consider having actual usage data of a facet on a single server. The comparison can compare the actual usage data for that single facet to a baseline usage on that same server over distinct periods of time, a baseline usage on other servers over the same period of time, a baseline usage of a group of servers over a distinct period of time, and/or a baseline usage of the entire network with respect to that facet over a period of time.

Based on the comparison, a relative anomaly score can be determined for that facet based on a difference between the baseline value and the actual usage value. The relative anomaly score for each facet being compared can be based on how many standard deviations away from the average or median actual usage is from baseline usage. For example, actual usage data which is two standard deviations away from the average usage can have a higher anomaly score than actual usage data which is only a single standard deviation away from average. The more standard deviations the data is from the average, the more anomalous the behavior. The anomaly score can be calculated using comparisons of average and baseline data other than standard deviations. For example, rather than using standard deviations, the anomaly score can be based on a number of pre-set ranges which exist between the average and baseline numbers. Additionally, the anomaly score can be linear, non-linear, and/or based on user customized ranges, deviations, or rates.

Each facet can have a maximum number of points assigned to it, the maximum number of points indicating how important seeing anomalous behavior for that particular facet is to an analyst. Combining this with the standard deviations described above, consider a facet which is very important and carries an importance score of 100. Based on the anomaly score (and due to being within a standard deviation of the average usage level) the facet is identified as 15% abnormal, resulting in an anomaly score of 15%× 100=15. However, another facet could have an importance level of 60 but be 50% abnormal, resulting in an anomaly score of 50%×60=30. Scores for each facet of an individual server, group of servers, or network can be added together to generate an overall score.

For example, a facet which is 1 standard deviation away from the average would receive a score of 1 while a facet which is 3 standard deviations away from the average would receive a score of 3. If the facet were weighted or otherwise enriched, the original score could be multiplied by the weight, used in a logarithmic function, or otherwise modified, to present an updated score. One example of enrichment could be identifying use of an Internet Protocol address by a particular facet, which would trigger the standard score being multiplied by a weighting factor. For a server, the total score can be the sum of all the facets on the server. Alternatively, the score can be the product of the facet scores (i.e., the result of multiplying the facet scores together) or used in a function to compute the server score.

The scores can be displayed to a user or administrator as a graph, where the y axis represents the average score of each facet or server, while the x axis is number of days out of a number of days where the score has been anomalous. Therefore, in this example, the further to the right and the higher a server score was located, the higher likelihood there is that an anomaly is occurring, whereas the further to the left and bottom (i.e., near the intersection of the x-axis and the y-axis) indicates a lower likelihood of anomalous behavior.

In practice, most configurations will have multiple facets being compared, and the relative anomaly scores of each facet are used to generate an overall anomaly score for each server being analyzed. The anomaly score for each server indicates a likelihood of an anomaly occurring at each server and/or at a group of servers. The anomaly scores for all the servers and groups of servers can then be compiled into an anomaly report and presented to a network administrator who can quickly review the report and identify which network nodes need to be isolated, removed, reviewed, and/or fixed. The anomaly report can also have an aspect of granularity, where the network administrator is able to select values in the report and have access to information explaining why a particular anomaly score was given.

For example, consider a network administrator who sees, based on an anomaly score, that a group of host servers in Boston are likely having intrusion issues. The network administrator, upon selecting the group of Boston host servers in the anomaly report, is presented with an anomaly report for just the Boston group. The Boston group anomaly report could list each host and the respective anomaly scores for each host in the group. The network administrator in this example identifies, based on the respective anomaly scores, that a pair of troubled hosts are responsible for the overall group score and reviews each host in turn. Upon reviewing the actual facet data of each troubled host, and seeing the comparison to the baseline facet data, the network administrator identifies that one of the troubled hosts erroneously had a weather gadget installed, and the weather gadget was generating a large amount of network traffic. The network administrator also identifies the other troubled host as having a 50 times increase in administrator usage, indicating a possible intrusion and/or corruption.

These and various other embodiments are described in detail below. While specific implementations are described, it should be understood that this is done for illustration purposes only. Other components and configurations may be used without parting from the spirit and scope of the disclosure. A brief introductory description of a basic general purpose system or computing device in FIG. 1 which can be employed to practice the concepts is disclosed herein. A more detailed description of assessing anomaly risk will then follow, accompanies by additional examples and variations. These variations shall be described herein as the various embodiments are set forth. The disclosure now turns to FIG. 1.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 120, bus 110, display 170, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 100 is a small, handheld computing device, a desktop computer, or a computer server.

Although the exemplary embodiment described herein employs the hard disk 160, other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

Figure 2:
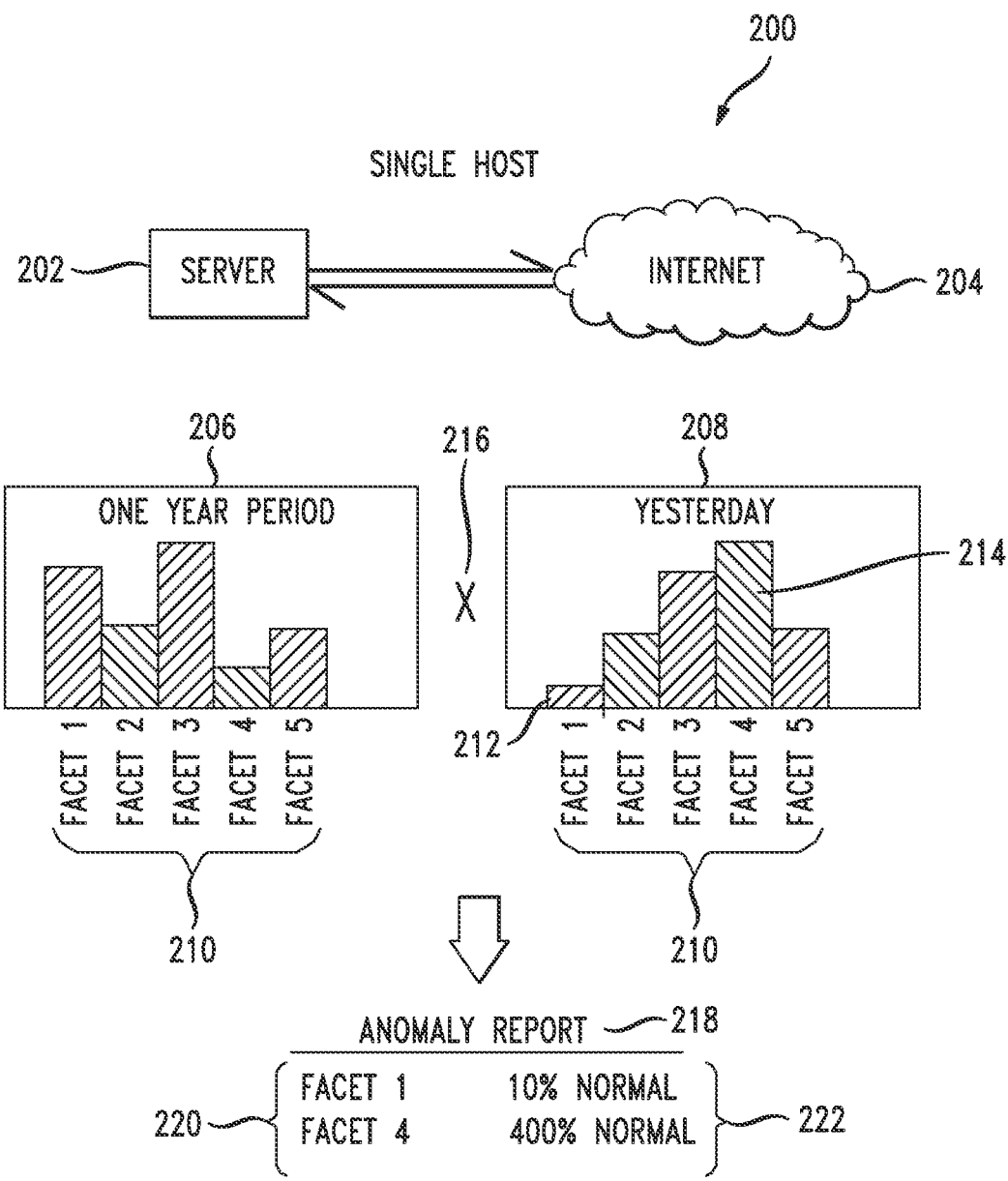
FIG. 2 illustrates generation of an anomaly report for a single host.

Having disclosed some components of a computing system, the disclosure now turns to FIG. 2, which illustrates exemplary generation of an anomaly report for a single host 200. As illustrated, a single server 202 is connected to the Internet 204 and/or another network. A baseline usage 206 for the single server 202 is identified. In this example 200, five facets 210 of data are identified for a one year period of time, with the data representing the average daily use over the year. Other configurations can have more or less facets, or different facets, and can also be for longer or shorter periods of time. For example, the time period could be one hour, two hours, one day, one week, a month, six months, five years, or any other time period. The data can also represent a sum over the same periods of time. Actual usage data 208 is obtained for the same five facets 210. The system compares 216 the baseline usage data 206 to the actual usage data 208. As illustrated, facets 2, 3, and 5 are at the same levels of usage in the actual usage and the baseline usage. However, facet 1 212 in the actual usage is significantly lower than the baseline usage of facet 1. Facet 4 214 in the actual usage is significantly higher than the baseline usage of facet 4.

In this example 200, only the facets whose usage data varies in a statistically significant manner are listed 220 in the anomaly report 218, accompanied by information indicating what caused the facet to appear in the anomaly report 218. In this case, the actual usage of facet 1 is only at $\frac{1}{10}$ of the normal (baseline) usage, whereas the actual usage of facet 4 is at 4 times normal. Other configuration and embodiments can display the data in a distinct manner. For example, in other embodiments the anomaly report can list all of the facets (even those which do not vary statistically from the baseline). In addition, whereas this example presents the relative percentage of use of a particular facet 222, other configurations can present a score for each facet which is based on how much each facet varies statistically from the baseline (i.e., using standard deviations and/or other statistical calculations). In yet other configurations, the score can be "unbounded," so there is no limit on how high (or low) a score can be. For example, whereas a normal score can be based on relative percentages of normal versus current use, in the unbounded configuration the score can be based on the number of interactions rather than relative percentages.

Figure 3:
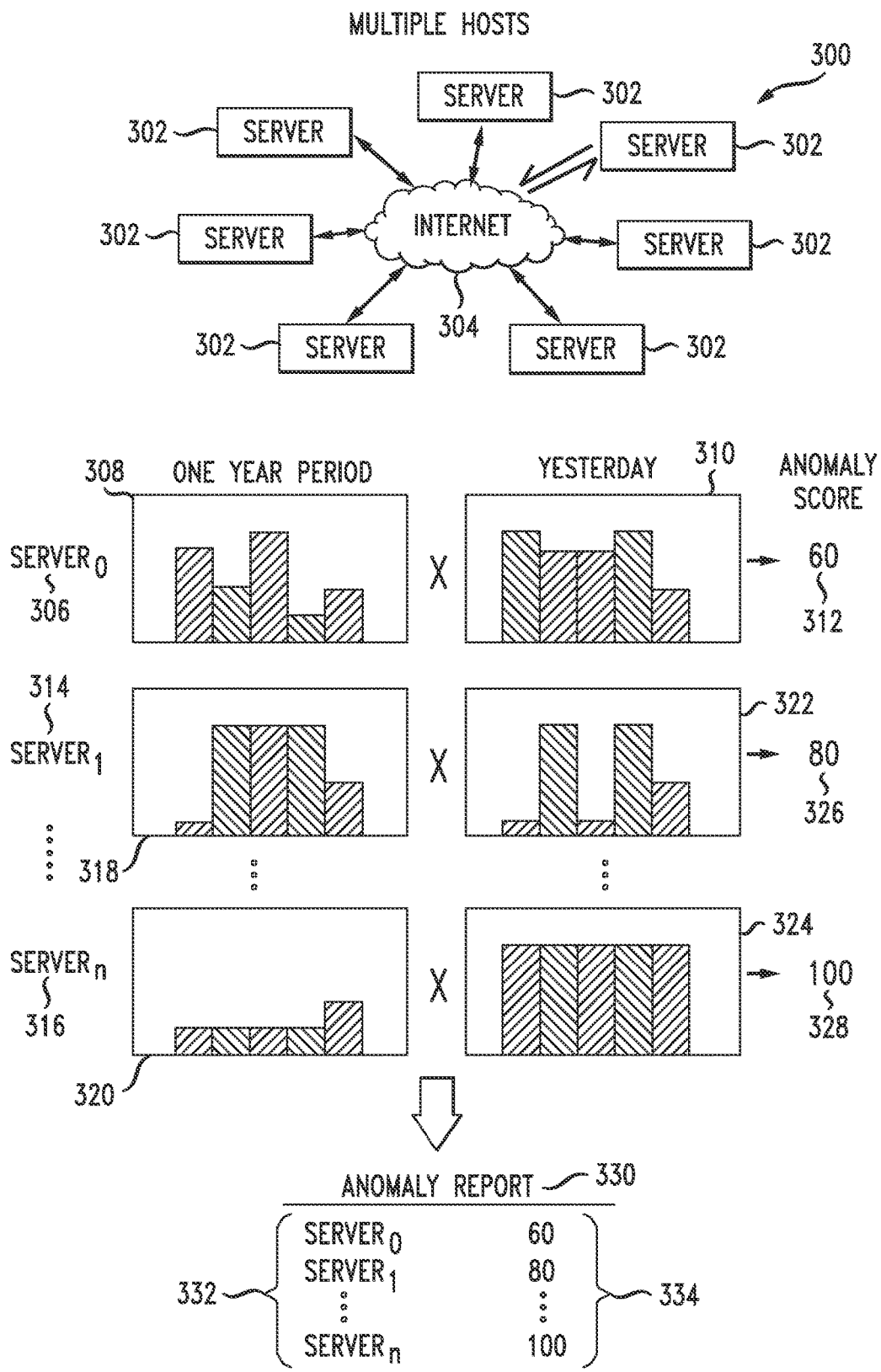
FIG. 3 illustrates generation of an anomaly report for multiple hosts.

FIG. 3 illustrates generation of an anomaly report for multiple hosts 300. Multiple servers (hosts) are connected via a network 304, such as the Internet. To prepare the anomaly report 330, actual usage data for each server in the network is compared to baseline usage data specific to each server. For example, if the illustrated network of servers includes $server_0$ 306, $server_1$ 314, and $server_n$ 316, the respective baselines 308, 318, 320 for each server will be compared to the actual usage data 310, 322, and 324 for each server. The comparison is used to generate an anomaly score for each server. Thus for $server_0$, comparison of the $server_0$ baseline data 308 to the actual $server_0$ usage data 310 results in an anomaly score 312 which is specific to $server_0$. Likewise, the other servers receive respective anomaly scores 326, 328. The anomaly scores 312, 326, 328 are used to construct an anomaly report 330. The illustrated anomaly report 330 lists all of the servers 332 in the network, accompanied by their respective anomaly scores 334. Other configurations can display only those servers which have anomaly scores above a threshold value.

As illustrated 300, each server 302 has actual usage data compared to usage over a single baseline time period. However, the comparison can be to multiple time periods. For example, the actual usage data 310 for $server_0$ 306 could be compared to baseline data for one year 308 as illustrated as well as baseline data for the past month and the past week. The anomaly score can be based on all three comparisons. In addition, the time periods used for both actual usage and baseline usage data can be identical between the various servers or can vary. Continuing the example, $server_0$ 306 could use actual usage data from yesterday 310 in comparison with baseline data from the past year 308, the past month, and the past week. $Server_1$ 314 could use the past two months as the actual usage data, comparing the past two months to a two month time period beginning six months ago as well as comparing the past hour of usage data with the baseline data of a different hour yesterday.

The anomaly report 330 can allow a user to select any individual server 332 and view information similar to the anomaly report 220 illustrated in FIG. 2. That is, a user can go from a broad view of the overall network down into the particulars of a single server or group of servers. Likewise, when viewing a single server as illustrated in FIG. 2, if the server is part of a larger network, a user can move from the single server to a larger network view of the anomaly report 330.

Figure 4:
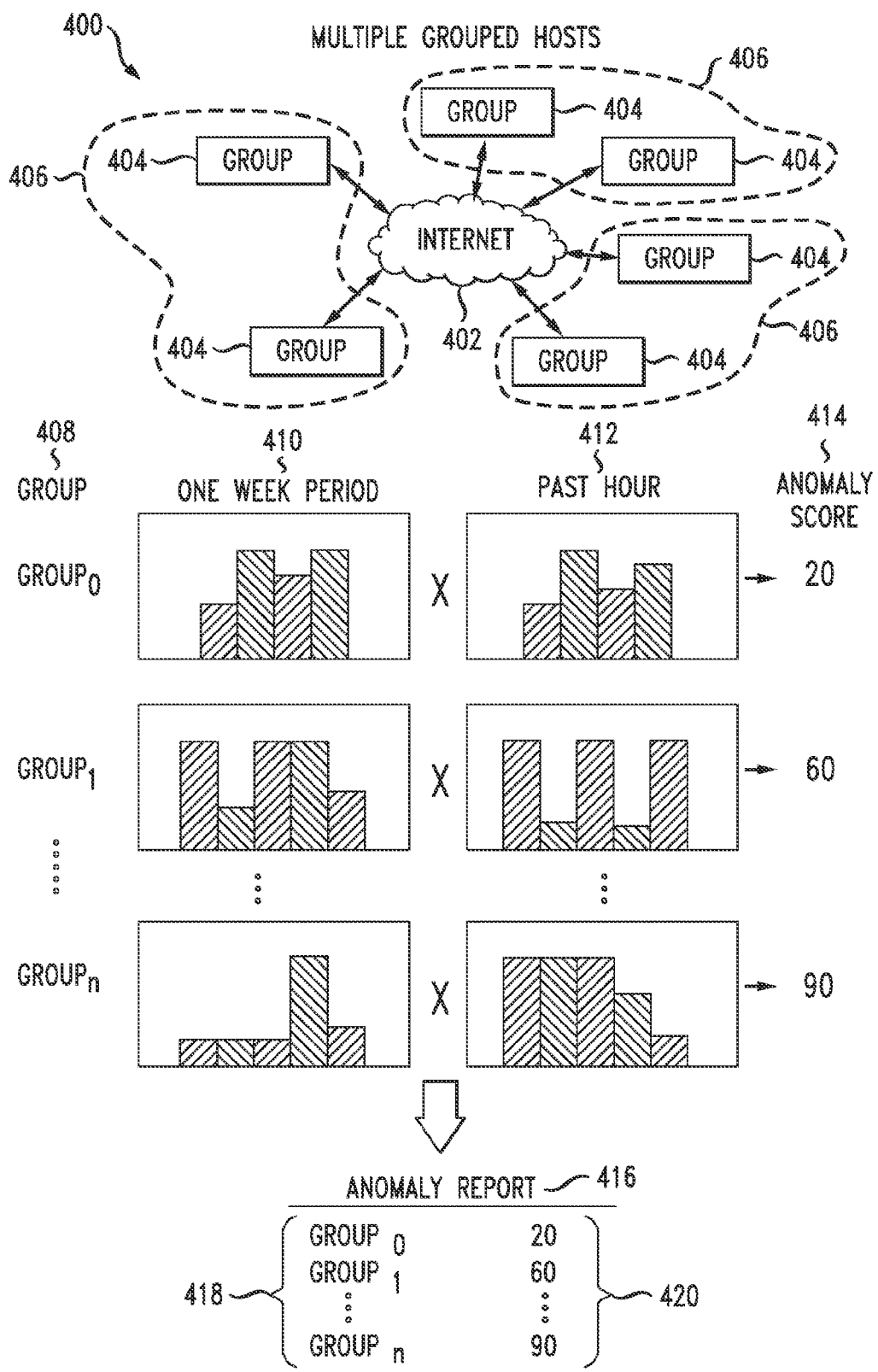
FIG. 4 illustrates generation of an anomaly report for grouped hosts.

FIG. 4 illustrates generation of an anomaly report for grouped hosts 400. As in FIG. 3, multiple servers 404 are connected together via a network 402, such as the Internet. However, in this case the servers 404 can be placed in groups 406. As a non-limiting example, a group of servers hosting particular data, performing specific tasks, or located in a common geographic area, can be grouped together. Each group 408 can then have baseline usage data 410 and actual usage data 412 compared as described above, resulting in anomaly scores 414 for each group. As with individual servers, the resulting anomaly report 416 can list groups of servers 418 which have anomaly scores 420 above a threshold value, or can list all of the groups of servers. Again, users or administrators can also select to always see (or not see) specific groups, and the anomaly report 416 allows modification of the granularity such that a user can view all groups, servers in a group, or an individual server, eventually being able to see the specific facets which resulted in the anomaly score 420.

Figure 5:
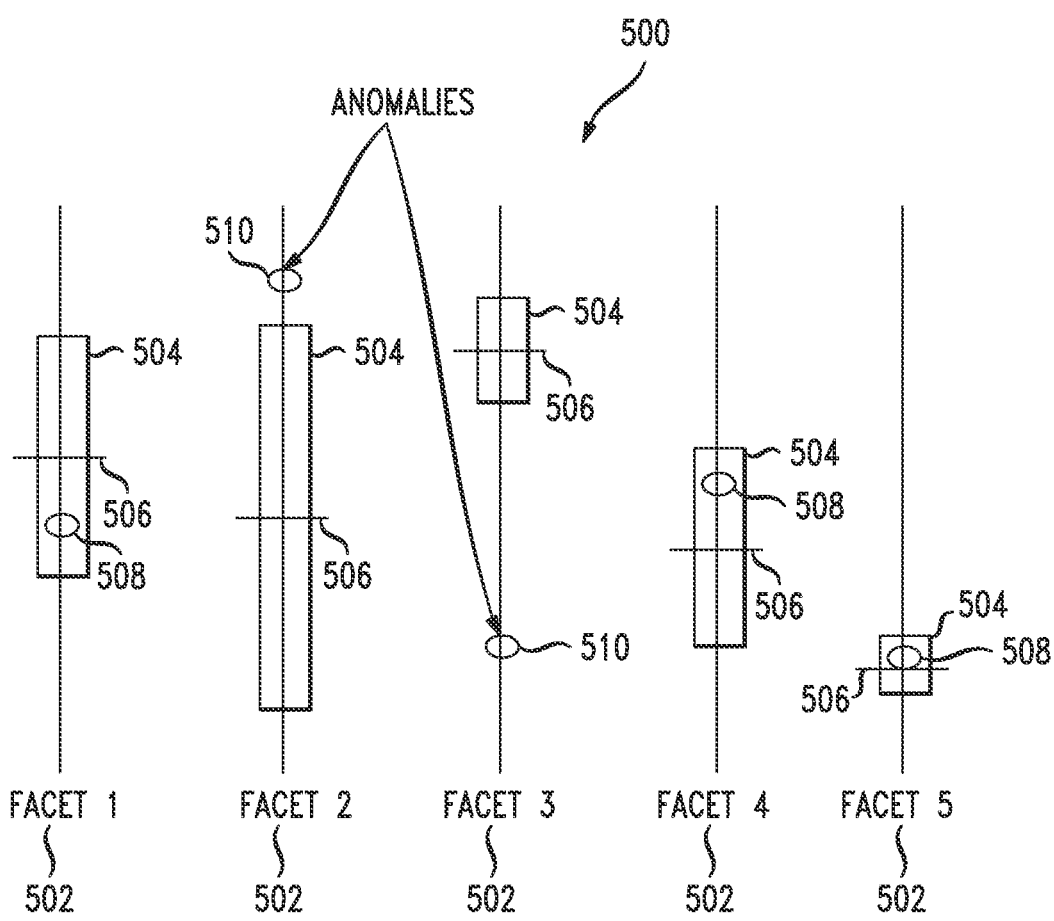
FIG. 5 illustrates an example of identifying anomalies in various facets.

FIG. 5 illustrates an example 500 of identifying anomalies in various facets 502. Each facet 502 illustrated has a range of normal use 504, as well as an average usage 506. As discussed herein, a system identifies the illustrated average ranges 504 and average use values 506 for each facet 502 (the average use value 506 is the exact average value, not a range). The average range 504 and the average use value 506 can constitute the baseline usage, and can be retrieved or calculated from stored values or stored data. The average range 504 can also illustrate the variability of the data. For example, the range 504 can illustrate the range of values within a standard deviation, or multiple standard deviations, of the average use value 506. As additional data is analyzed, the additional data can be saved, added to, and/or combined with the pre-existing data and used in future analyses.

The system also identifies actual usage data 508, 510. The actual usage data 508, 510 can be a snapshot of a time period, identifying a total number of interactions during the time period. Alternatively, the actual usage data 508, 510 can be an average over a time period. When the actual usage data 508 is within the average use ranges 504, the system can identify the data usage as normal. For example, the system can assign such facets an abnormality value of zero. However, when the actual usage data 510 is outside the average use ranges 504, the system identifies such usage 510 as an anomaly and can assign the associated facet a corresponding abnormality value.

Figure 6:
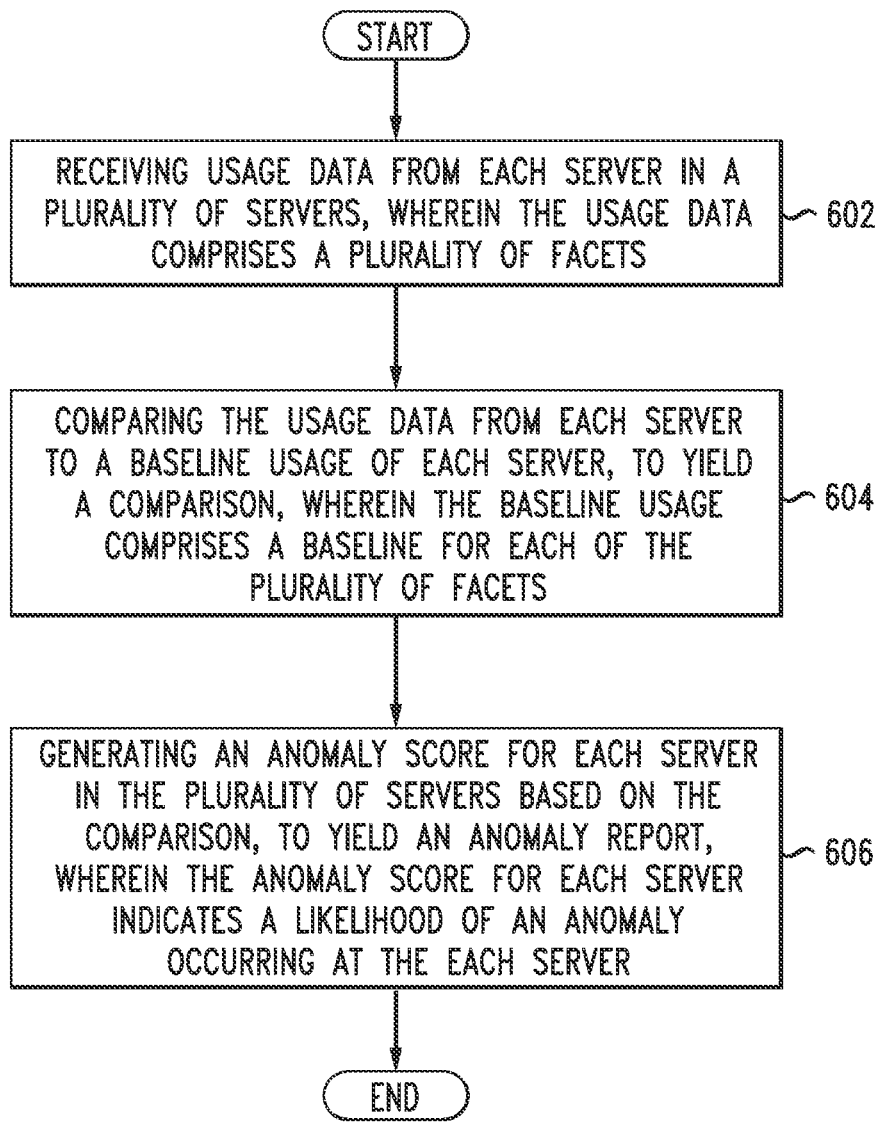
FIG. 6 illustrates a first example method embodiment.

Having disclosed some basic system components and concepts, the disclosure now turns to the first exemplary method embodiment shown in FIG. 6. For the sake of clarity, the method is described in terms of an exemplary system 100 as shown in FIG. 1 configured to practice the method. The steps outlined herein are exemplary and can be implemented in any combination thereof, including combinations that exclude, add, or modify certain steps.

The system 100 receives usage data from each server in a plurality of servers, wherein the usage data comprises a plurality of facets (602). The plurality of facets can include usage rate of protocols, ports used, access times, a number of incoming connections, a number of outgoing connections, and a rate of administrator access. Exemplary protocols can include DHCP, DNS, SMTP, Peer-to-Peer, and weather-gadget-like protocols. The system 100 then compares the usage data from each server to a baseline usage of each server, to yield a comparison, wherein the baseline usage comprises a baseline for each of the plurality of facets (604). The system 100 can establish the baseline usage based on patterns for each server over a first period of time, and the usage data can be recorded over a second period of time. The first period of time and the second period of time can be the same or can differ. Exemplary periods of time include one year, one month, one day, one hour, one minute, one second, including multiples and/or any combination thereof.

The system 100 generates an anomaly score for each server in the plurality of servers based on the comparison, to yield an anomaly report, wherein the anomaly score for each server indicates a likelihood of an anomaly occurring at the each server (606). The anomaly report can have a granularity which can be modified by a user viewing the anomaly report, where the granularity can be modified from a single server in the plurality of servers to the all of the plurality of servers. In addition, the anomaly score can be based on by how many standard deviations the usage data differs from the baseline usage.

The system 100 can also group each server in the plurality of servers into a group in a plurality of groups, such that each group in the plurality of groups comprises at least two servers. The system 100 can then compare group usage data from each group in the plurality of groups to a group baseline usage of each group (or to single servers which do not conform to one of the groups), to yield a group comparison, where the group baseline usage comprises a group baseline for a grouped aggregate of each of the plurality of facets, and generate a group anomaly score for each group in the plurality of groups based on the group comparison, to yield a group anomaly report, wherein the group anomaly score for each group indicates a likelihood of an anomaly occurring at the each group. The group anomaly report can have a granularity which can be modified by a user viewing the group anomaly report, wherein the granularity can be modified from a single group in the plurality of groups to all of the plurality of groups.

Figure 7:
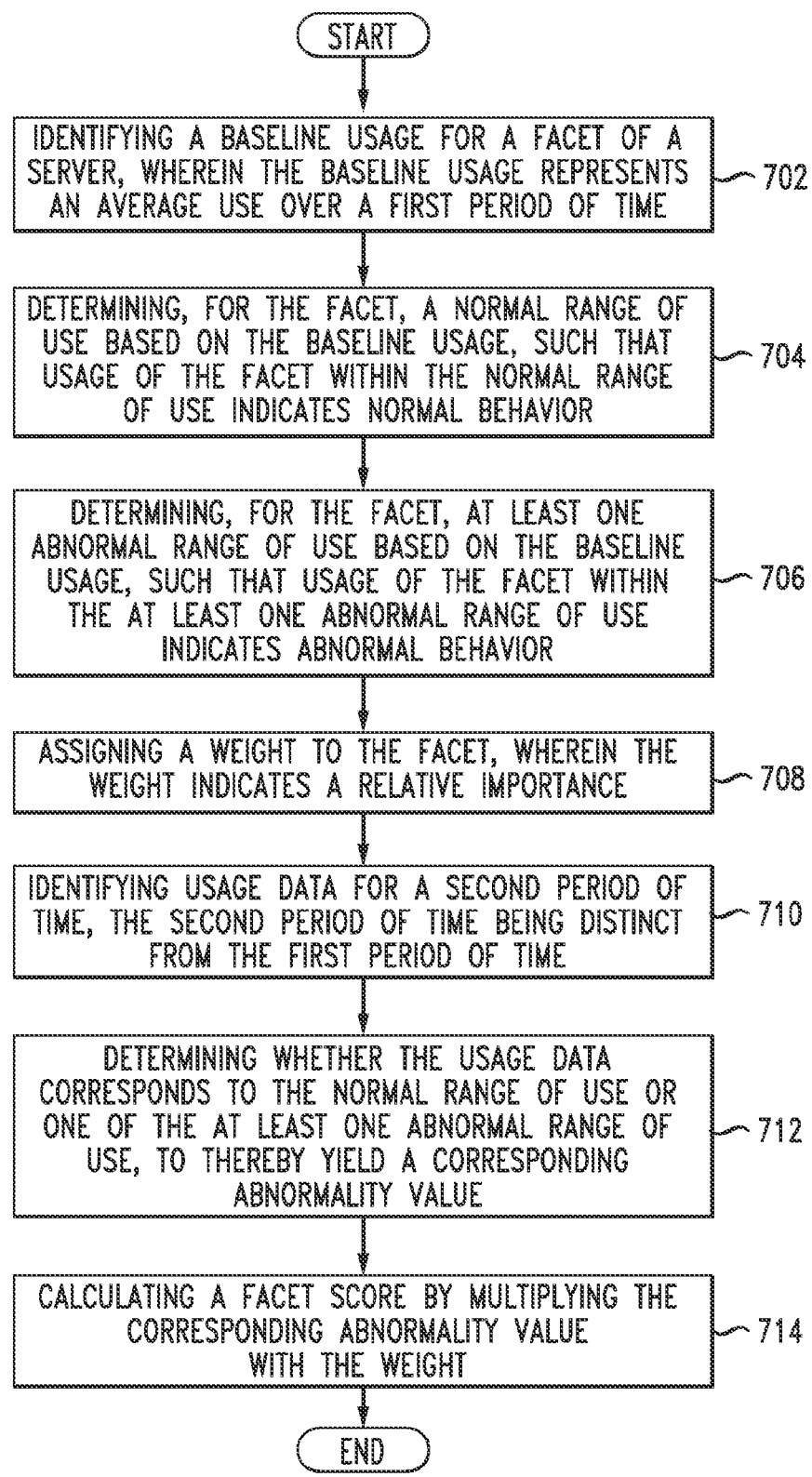
FIG. 7 illustrates a second example method embodiment.

The disclosure now turns to the second exemplary method embodiment shown in FIG. 7. For the sake of clarity, the method is described in terms of an exemplary system 100 as shown in FIG. 1 configured to practice the method. The steps outlined herein are exemplary and can be implemented in any combination thereof, including combinations that exclude, add, or modify certain steps.

The system 100 identifies a baseline usage for a facet of a server, wherein the baseline usage represents an average use over a first period of time (702). The system determines, for the facet, a normal range of use based on the baseline usage, such that usage of the facet within the normal range of use indicates normal behavior (704) and at least one abnormal range of use based on the baseline usage, such that usage of the facet within the at least one abnormal range of use indicates abnormal behavior (706).

A weight is assigned to the facet, wherein the weight indicates a relative importance (708). The system 100 identifies usage data for a second period of time, the second period of time being distinct from the first period of time (710). The usage data can be a snapshot representing total usage over the second period of time, or can be an average use value over the second period of time. The system 100 can determine whether the usage data corresponds to the normal range of use or one of the at least one abnormal range of use, to thereby yield a corresponding abnormality value (712). When the usage data corresponds to one of the at least one abnormal range of use, the corresponding abnormality value can increase as the usage data is further from the average use. That is, the further the actual usage data is outside the baseline, or normal, use range, the higher the abnormality value will be. Likewise, when the usage data corresponds to the normal range of use, the corresponding abnormality value can be zero. The system 100 can then calculate a facet score by multiplying the corresponding abnormality value with the weight (714). The system 100 can also store the baseline usage for use in later comparisons. For example, the system 100 can store the baseline usage values and use them to compare baseline values of different time periods, to establish new baseline usage patterns, add stored values to current usage data, or for future comparisons to current usage data.

In addition, the system 100 can select both the first time period and the facet under analysis. This selection can occur based on a report received which indicates a time period and/or facet which needs review, or can be made using user input, previous reports, a pattern of selection (for example, a score could be calculated every Sunday morning). In addition, the abnormality value corresponding to the facet can be just one of multiple abnormality values associated with different facets of the server. These scores can be summed together, averaged, or otherwise compiled, to determine abnormality scores for groups of facets and/or the server. As discussed with other embodiments, the individual abnormality values of specific facets or the server can be added, summed, or compiled with other groups of servers or networks associated with the server.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply to intrusion detection, power outages, and weather gadget manipulation. Various modifications and changes may be made to the principles described herein without following the example embodiments and applications illustrated and described herein, and without departing from the spirit and scope of the disclosure.

I claim:

1. A method of network intrusion detection for use with a processor and memory comprising instructions executed by the processor, comprising:

identifying a baseline usage for a plurality of behavioral facets relevant to network intrusion detection on a plurality of servers, wherein the baseline usage represents a measurement of use over a first period of time;

automatically determining, for each behavioral facet, a normal range of use based on the baseline usage, such that usage of each behavioral facet within the normal range of use indicates normal behavior;

automatically determining, for each behavioral facet, at least one abnormal range of use based on the baseline usage, such that usage of each behavioral facet within the at least one abnormal range of use indicates abnormal behavior;

identifying usage data for a second period of time, the second period of time being distinct from the first period of time;

determining whether the usage data corresponds to the normal range of use or one of the at least one abnormal range of use, to thereby yield a corresponding abnormality value wherein the abnormality value represents how much the facet varies statistically over time from the baseline usage; and calculating a behavioral facet score based on the corresponding abnormality value;

automatically generating an anomaly report including behavioral facet information; and detecting network intrusion by accessing behavioral facet information from the anomaly report.

2. The method of claim 1, further comprising:
assigning a weight to the behavioral facet, wherein the weight indicates a relative importance, wherein the behavioral facet score is further calculated by multiplying the corresponding abnormality value with the weight.

3. The method of claim 1, further comprising:
storing the baseline usage for later comparison.

4. The method of claim 1, wherein the usage data is averaged over the second period of time.

5. The method of claim 1, wherein the usage data is a snapshot representing total usage over the second period of time.

6. The method of claim 1, further comprising selecting the first time period and the behavioral facet.

7. The method of claim 1, wherein when the usage data corresponds to the normal range of use, the corresponding abnormality value is zero.

8. The method of claim 1, wherein when the usage data corresponds to one of the at least one abnormal range of use, the corresponding abnormality value increases as the usage data is further from the average use.

9. The method of claim 1 wherein at least one of the plurality of behavioral facets is the number of files a user accesses.

10. The method of claim 1 wherein at least one of the plurality of behavioral facets is an upload rate or a download rate.

11. The method of claim 1 wherein at least one of the plurality of behavioral facets is selected from the group consisting of the number of incoming connections between a specified time range, number of outgoing connection between a specified time range, the number of changes to files in an executable path, and the number of USB device attached to a server.

12. The method of claim 1 further comprising dynamically:
storing the baseline usage; and
establishing new baseline usage by comparing the stored baseline usage to baseline usage of a different time period.

13. A system for network intrusion detection comprising:
a processor; and
a non-transitory computer-readable storage medium having instructions stored which, when executed by the processor, cause the processor to perform operations comprising:

identifying a baseline usage for a plurality of behavioral facets relevant to network intrusion detection on a plurality of servers, wherein the baseline usage represents a measurement of use over a first period of time;

automatically determining, for each behavioral facet, a normal range of use based on the baseline usage, such that usage of each behavioral facet within the normal range of use indicates normal behavior;

automatically determining, for each behavioral facet, at least one abnormal range of use based on the baseline usage, such that usage of each behavioral facet within the at least one abnormal range of use indicates abnormal behavior;

identifying usage data for a second period of time, the second period of time being distinct from the first period of time;

determining whether the usage data corresponds to the normal range of use or one of the at least one abnormal range of use, to thereby yield a corresponding abnormality value, wherein the abnormality value represents how much the facet varies statistically over time from the baseline usage;

calculating a behavioral facet score based on the corresponding abnormality value;

automatically generating an anomaly report including behavioral facet information; and detecting network intrusion by accessing the behavioral facet information from the anomaly report.

14. The system of claim 13, the non-transitory computer-readable storage medium having additional instructions stored which, when executed by the processor, result in operations comprising:
assigning a weight to the behavioral facet, wherein the weight indicates a relative importance, wherein the behavioral facet score is further calculated by multiplying the corresponding abnormality value with the weight.

15. The system of claim 13, the non-transitory computer-readable storage medium having additional instructions stored which, when executed by the processor, result in operations comprising:
storing the baseline usage for later comparison.

16. The system of claim 13, wherein the usage data is averaged over the second period of time.

17. The system of claim 13, wherein the usage data is a snapshot representing total usage over the second period of time.

18. The system of claim 13, the non-transitory computer-readable storage medium having additional instructions stored which, when executed by the processor, result in operations comprising selecting the first time period and the behavioral facet.

19. The system of claim 13, wherein when the usage data corresponds to the normal range of use, the corresponding abnormality value is zero.

20. The system of claim 13, wherein when the usage data corresponds to one of the at least one abnormal range of use, the corresponding abnormality value increases as the usage data is further from the average use.

21. The system of claim 13 wherein at least one of the plurality of behavioral facets is the number of files a user accesses.

22. The system of claim 13 wherein at least one of the plurality of behavioral facets is an upload rate or a download rate.

23. The system of claim 13 wherein at least one of the plurality of behavioral facets is selected from the group consisting of the number of incoming connections between a specified time range, number of outgoing connection between a specified time range, the number of changes to files in an executable path, and the number of USB device attached to a server.

24. The system of claim 13 further comprising dynamically:
   storing the baseline usage; and
   establishing new baseline usage by comparing the stored baseline usage to baseline usage of a different time period.

25. A non-transitory computer-readable medium having instructions stored which, when executed by a computing device, cause the computing device to perform operations comprising:
   identifying a baseline usage for a plurality of behavioral facets relevant to network intrusion detection on a plurality of servers, wherein the baseline usage represents an average use over a first period of time;
   automatically determining, for each behavioral facet, a normal range of use based on the baseline usage, such that usage of each behavioral facet within the normal range of use indicates normal behavior;
   automatically determining, for each behavioral facet, at least one abnormal range of use based on the baseline usage, such that usage of each behavioral facet within the at least one abnormal range of use indicates abnormal behavior;
   identifying usage data for a second period of time, the second period of time being distinct from the first period of time;
   determining whether the usage data corresponds to the normal range of use or one of the at least one abnormal range of use, to thereby yield a corresponding abnormality value, wherein the abnormality value represents how much the facet varies statistically over time from the baseline usage;
   calculating a behavioral facet score based on the corresponding abnormality value;
   automatically generating an anomaly report including behavioral facet information; and
   detecting network intrusion by accessing the behavioral facet information from the anomaly report.

26. The non-transitory computer-readable medium of claim 25, having additional instructions stored which, when executed by the computing device, result in operations comprising:
   storing the baseline usage for later comparison.

27. The non-transitory computer-readable medium of claim 25, wherein the usage data is averaged over the second period of time.

28. The non-transitory computer-readable medium of claim 25, wherein the usage data is a snapshot representing total usage over the second period of time.

* * * * *